United States Patent [19]
Funghini et al.

[11] Patent Number: 4,648,837
[45] Date of Patent: Mar. 10, 1987

[54] WALKING BEAM FURNACE

[75] Inventors: Augusto Funghini, Solingen; Dieter Schwab; Helmut Springer, both of Düsseldorf, Fed. Rep. of Germany

[73] Assignee: Italimpianti S.p.A., Genova, Italy

[21] Appl. No.: 794,758

[22] Filed: Nov. 4, 1985

[30] Foreign Application Priority Data
Nov. 2, 1984 [DE] Fed. Rep. of Germany ....... 3440126

[51] Int. Cl.⁴ ................................................ F27B 9/14
[52] U.S. Cl. .................................... 432/122; 432/124; 432/127; 198/614; 198/774
[58] Field of Search ....................... 432/122, 124, 127; 198/614, 774

[56] References Cited
U.S. PATENT DOCUMENTS
3,664,649  5/1972  Brockmann .......................... 432/122
3,887,064  6/1975  Brockmann .......................... 432/122

FOREIGN PATENT DOCUMENTS
368506  3/1932  United Kingdom ................ 198/774

Primary Examiner—Henry C. Yuen
Attorney, Agent, or Firm—Toren, McGeady and Goldberg

[57] ABSTRACT

A walking beam furnace comprises a hearth formed by fixed and walking beams disposed with their axes in the feed direction. Both the walking beams and the fixed beams are divided at positions spaced apart in the feed direction into sections, and each section of each beam is staggered relative to the adjacent section. As a result, the material to be annealed comes into contact with the cooled fixed beams at different positions at each of the conveying pauses and temperature balancing takes place at the points of contact.

3 Claims, 4 Drawing Figures

WALKING BEAM FURNACE

This invention relates to a walking beam furnace comprising a hearth consisting of fixed and walking beams disposed with their longitudinal axes parallel to the feed direction through the furnace.

For annealing material, especially blooms or ingots, walking beam furnaces and pacemaker furnaces have long been known. Their use is preferred in rolling mills, because they assure a more uniform heating throughout the material and convey the material with less risk of damage than, for example, pusher-type furnaces.

During conveying through the furnace, the material to be annealed is deposited after each stroke of the walking beams on the fixed beams for several minutes. These pauses between conveying strokes provide on the one hand a sufficient dwell time of the material in the furnace and, on the other hand, time for the walking beams to return to their lowered starting position. Since even at high furnace temperatures the form and load-bearing capacity of the walking and fixed beams must be maintained, they are usually composed of pipes through which coolant flows. As a result, during the time when the material to be annealed is resting upon the cooled fixed beams, temperature differences of up to 150° C., known as cooling shadows, occur at the contact points of the material with the fixed beams.

Temperature differences in the material being annealed adversely affect the surface quality, the dimensional stability, and the engineering properties of the material, and the rolling mill operator endeavours to obtain a reduction of the unavoidable temperature differences in the material undergoing annealing to less than 30° C. For this purpose German Offenlegungsschrift (published specification) No. 22 53 105, discloses a once-through furnace with cooled carrying beams which can be lowered in groups, disposed parallel to the walking beams, which during the setting down and standing period of the material undergoing annealing alternately undertake the carrying operation, in that one group of the carrying beams is lowered at one time, so that after each change different points of the material undergoing annealing are in contact with the carrying beams. However, this furnace possesses the disadvantage, in addition to the walking beam drive required for all the carrying beams, of requiring a complex support construction with lever linkages.

The object of the present invention is to prevent the occurrence of excessively high temperature differences in the material undergoing annealing in a walking beam furnace, and in particular to avoid the aforementioned cooling shadows, without additional lifting or walking mechanisms being necessary for this purpose.

This object is achieved, according to the present invention, by a walking beam furnace of the initially mentioned type in which both the walking beams and the fixed beams are subdivided into sections at positions spaced apart in the direction of advance, and each section of each beam is staggered with respect to the adjacent section of the beam. In this manner, different regions of the material undergoing annealing, spaced sufficiently far from one another, come into contact with the fixed beams section by section during the conveying pauses.

In order that the contact points shall be sufficiently far apart for temperature equalizing, the beam sections are preferably so arranged that the sections form rows each of which consists of fixed and walking beam sections disposed alternately along a substantially common longitudinal axis. As a consequence, the walking beam furnace in accordance with this invention has the same dimensions as a walking beam furnace with fixed beams and walking beams each continuous in the direction of advance.

In order that the vertically and horizontally moving walking beam sections shall have sufficient clearance in the horizontal direction not to touch the adjacent fixed beam sections (in the line of advance) during their forward movement, the fixed beam sections must observe a sufficiently large spacing corresponding to the amplitude of the translatory movement of the walking beam sections. Basically, however, the spacings of the beam sections in the direction of advance must not exceed a minimum distance, in order that the material undergoing annealing shall always be adequately supported. The rearward ends of the fixed beam sections (with respect to the direction of advance through the furnace) are therefore preferably displaced laterally from the adjacent walking beam sections, so that on the one hand the walking beam sections have sufficient clearance and on the other hand the longitudinal gap between the sections remains sufficiently small or disappears entirely if the adjacent beam ends overlap one another. Preferably this is achieved by an obtuse-angled double cranked portion at the rear end of each fixed beam section opposite the front end of a walking beam section.

The invention is explained in more detail below with reference to the accompanying drawings which illustrate diagrammatically an example of a walking beam furnace in accordance with the invention, and in which.

Figure 2:
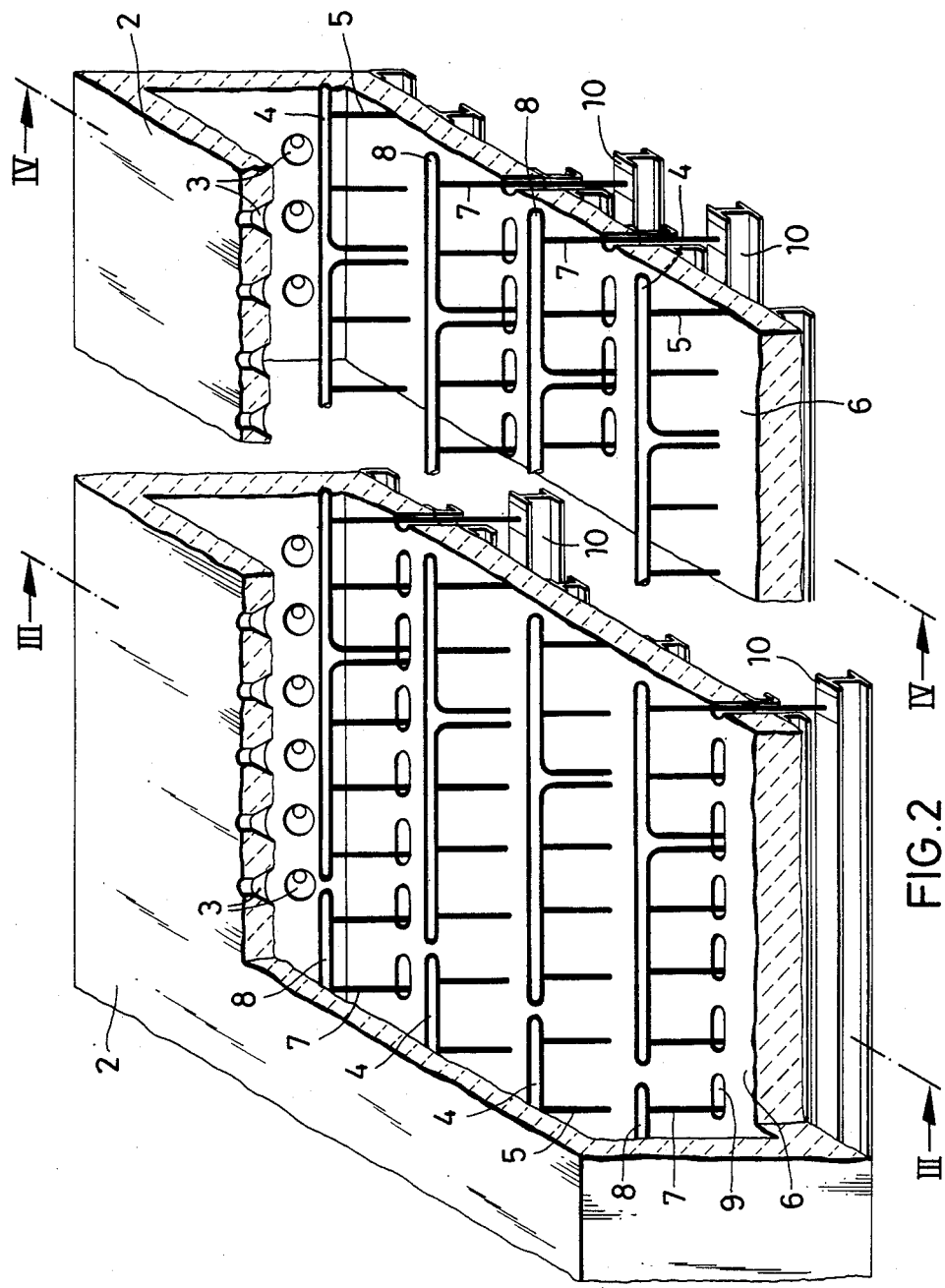
FIG. 2 is a partly cut away perspective view of two portions of the furnace.

The walking beam furnace 1 consists basically of a refractory housing 2 provided with roof and side-wall burners 3. Fixed beams 4 rest with columns 5 on the furnace floor 6, while columns 7 of walking beams 8 pass through openings 9 in the furnace floor 6 and are mounted on a common travelling frame 10 (FIG. 2). The travelling frame 10, which is driven by cylinders, travels with rollers on plane rails which are fixed on a second lifting frame, which itself slides with rollers on inclined rails and is driven by lifting cylinders, with the result that an inclined lifting motion and horizontal motion of the walking beams 8 is produced. Four fixed and four walking beams 4, 8 are disposed symmetrically about a longitudinal axis 11 of the furnace.

The fixed beams 4 are each subdivided into four fixed beam sections 12 to 15 of different lengths, and the walking beams 8 are each similarly subdivided into four walking beam sections 16 to 19 also of different lengths, the sections becoming shorter towards the discharge end of the furnace to provide a more frequent change of the contact points in the conveying direction. The first and third fixed beam sections 12, 14 are laterally offset from the second and fourth fixed beam sections 13, 15, and the walking beam sections are similarly arranged and interleaved with the fixed beams sections so that the sections form substantially parallel rows of alternating fixed and walking beam sections 12, 17, 14, 18 and 16, 13, 18, 15.

Figure 1:
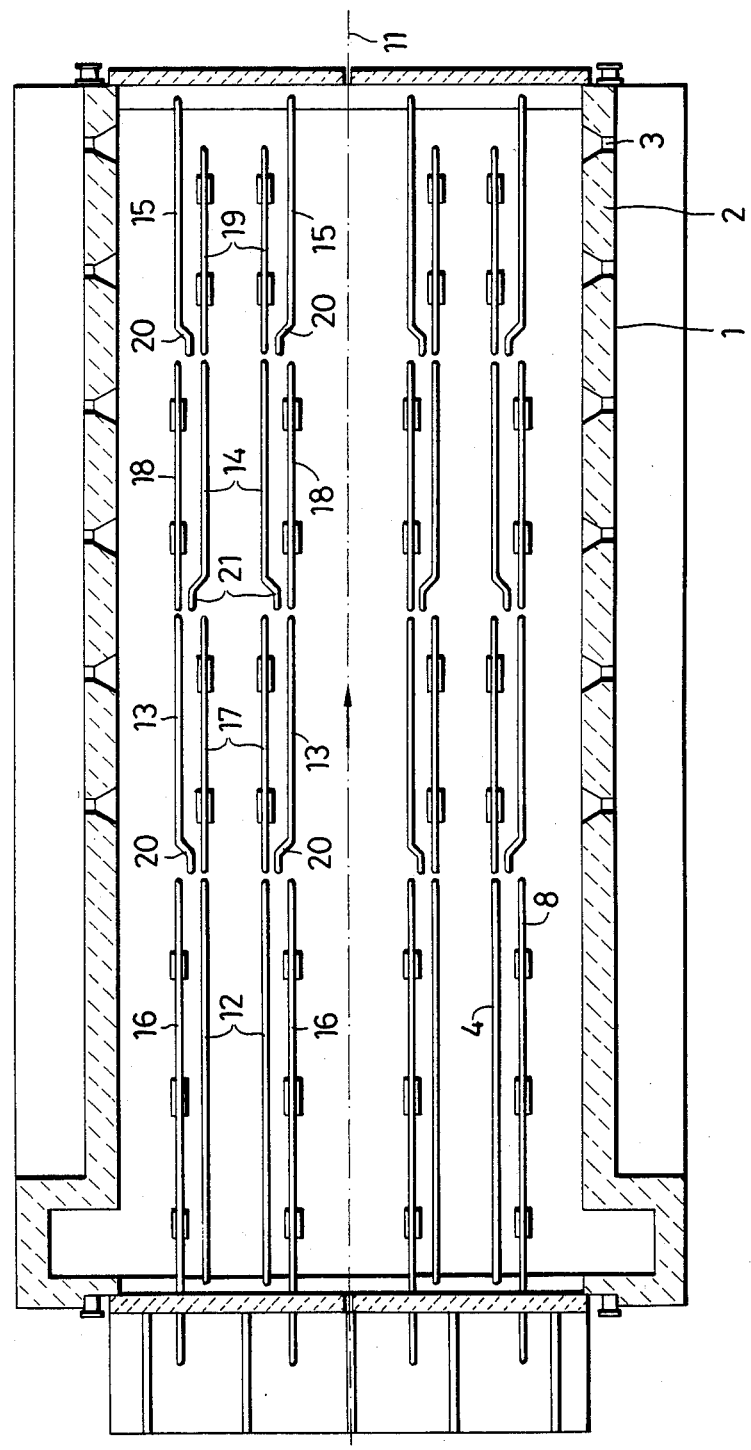
FIG. 1 is a plan view of the walking beam furnace.

As shown in FIG. 1, the fixed beam sections 13 to 15 following the first fixed beam section 12 are each cranked at its upstream end, i.e. the ends facing the furnace inlet are furnished with a double crank 20, 21, in order that the upstream walking beam sections 16 to 18 can move past the ends of the fixed beam sections 13 to 15 during an advancing movement. Thus the freedom of movement of the walking beam sections 16 to 18 and the complete carrying capacity of the fixed beam sections 13 to 15 is assured.

Figure 3:
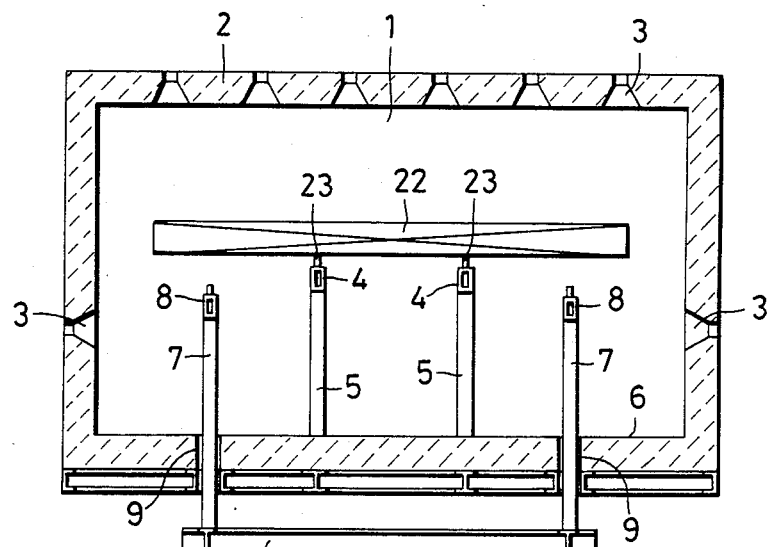
FIG. 3 is a section taken along the line III—III in FIG. 2.

In the region of the first and third beam sections, the fixed and walking beams 4, 8 are arranged as shown in FIG. 3, which shows the beams in the at-rest position. In this position the material undergoing annealing 22 is resting upon the fixed beams 4, and cooling shadows are produced at the contact points 23 as a consequence of the considerable cooling action of the fixed beams.

Figure 4:
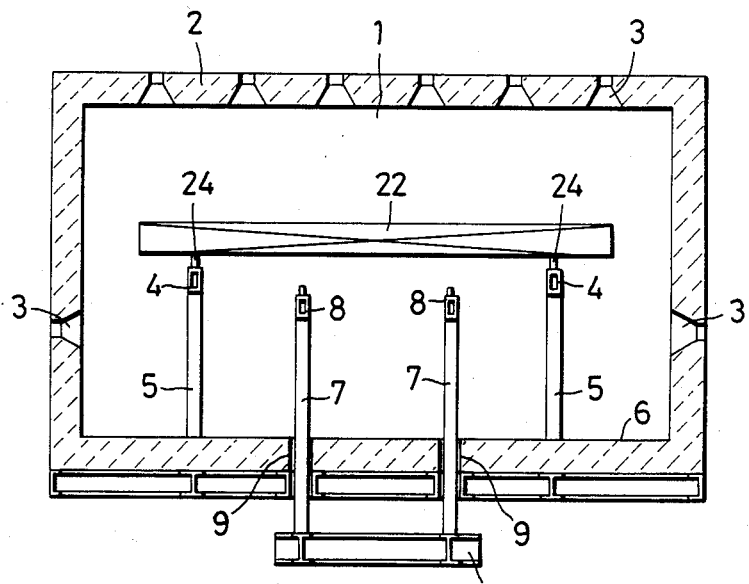
FIG. 4 is a section taken along the line IV—IV in FIG. 2.

In the region of the second and last beam sections, the fixed and walking beams 4, 8 are arranged as shown in FIG. 4 in the at-rest position, and since there are different contact points 24 the inadequately heated or cooled regions of the material 22 at the contact points 23 can now heat up and undesired temperature differences can be equalized. The cooling shadows forming at the contact points 24 are largely eliminated in the position of the beams 4, 8 illustrated in FIG. 3.

The spacings of the fixed and walking beams 4, 8 from one another are so chosen that the bearing forces on each beam section are of equal magnitude. Also, the ends of the blooms or ingots shall not strike with their end faces on a beam 4, 8 either in the at-rest position or in their forward movement, in order to prevent damage to the beam insulation.

We claim:

1. A walking beam furnace comprising a hearth consisting of fixed beams and walking beams disposed with their longitudinal axes parallel to the feed direction through said furnace, the improvement wherein each of said walking beams and said fixed beams is subdivided into sections at positions spaced apart in said feed direction and each of said sections of each of said beams is disposed staggered relative to the adjacent section of said beam, and each of said rows consisting of fixed beam sections disposed alternately with walking beam sections on a substantially common longitudinal axis.

2. A walking beam furnace according to claim 1, wherein said beam sections of each of said fixed beams following the first beam section of said fixed beam in said feed direction each has a rear end portion with respect to said feed direction, each of said rear end portions being laterally cranked.

3. A walking beam furnace according to claim 2, wherein each of said laterally cranked rear end portions of said fixed beam sections following said first section of each of said fixed beams consists of an obtuse-angled double crank.

* * * * *